Oct. 19, 1954 — E. WILDHABER — 2,691,876
EQUALIZER FOR UNIVERSAL JOINTS
Filed March 18, 1950 — 3 Sheets-Sheet 1

INVENTOR.
ERNEST WILDHABER
ATTORNEY

Oct. 19, 1954  E. WILDHABER  2,691,876
EQUALIZER FOR UNIVERSAL JOINTS
Filed March 18, 1950  3 Sheets-Sheet 2

INVENTOR.
ERNEST WILDHABER
BY
ATTORNEY

Oct. 19, 1954     E. WILDHABER     2,691,876
EQUALIZER FOR UNIVERSAL JOINTS
Filed March 18, 1950     3 Sheets-Sheet 3

INVENTOR.
ERNEST WILDHABER
BY
*Bfshlesinger*
ATTORNEY

Patented Oct. 19, 1954

2,691,876

UNITED STATES PATENT OFFICE 2,691,876

EQUALIZER FOR UNIVERSAL JOINTS

Ernest Wildhaber, Brighton, N. Y.

Application March 18, 1950, Serial No. 150,448

5 Claims. (Cl. 64—21)

The present invention relates to equalizers for distributing power flow to a plurality of movable parts while permitting relative motion of said parts to insure that all of said parts take their respective shares of the load. In a more specific aspect, the invention relates to equalizers for universal joints and universal joint drives of the types disclosed in my pending U. S. Patent applications Serial Nos. 102,788 and 123,561, filed July 2, 1949 and October 26, 1949, respectively.

In the universal joints and universal joint drives of my pending applications above mentioned, each of the pivot axes is part of an individual Cardan-type connection. When the axes of two connected shafts are at an angle, a Cardan-type joint will not transmit true uniform motion. The motion transmitted fluctuates; the amount of fluctuation increases with increase of the shaft angularity; and it repeats with every half revolution of the joint. In the universal joints and universal joint drives of my applications above mentioned, however, the Cardan joints are disposed in parallel and are in different phase. With two connections, they are in opposite phase. The motions transmitted through the two connections therefore fluctuate oppositely. When the transmitted motion is advanced from uniform motion position in one connection it lags behind in the other connection, and vice versa. The average motion is very nearly uniform. An equalizer is used to obtain the average motion, or to split up a motion into two oppositely varying components. Equalizers of this kind perform only a limited motion. It is to such equalizers that the present invention primarily relates.

One object of the present invention is to provide an equalizer for limited motion in which the fact that the equalizer is to be used only for limited motion is taken advantage of to secure a simplified construction.

Another object of the invention is to provide a simplified form of equalizer for limited motion in a universal joint having a plurality of pivoted equalizing members where the pivot axis of each equalizing member is located in an axial plane containing the axis of one end member of the universal joint.

Another object of the invention is to provide a simplified equalizer having a plurality of pivoted equalizing members whose axes are parallel and each of which has opposite working portions at different radii from its pivot axis.

Another object of the invention is to provide an equalizer for limited motion comprising a plurality of equalizing members pivoted on parallel axes in a carrier and each having teeth at opposite ends meshing with external and internal sun gears.

A further object of the invention is to provide an equalizer having a plurality of equalizing members in the form of levers which are journaled on their carrier on partial cylindrical outside surfaces.

Another object of the invention is to provide an equalizer having a plurality of equalizing members in the form of levers pivoted on a rotatable carrier about axes lying in the same plane as the carrier axis and having cylindrical working surfaces at opposite ends.

Another object of the invention is to provide a simplified uniform motion universal joint using equalizers in the form of equalizing levers that are mounted on axes radial of the joint.

Still another object of the invention is to provide an equalizer for universal joints of the type referred to which may coincide with or be offset from the universal joint proper.

A still further object of the invention is to provide a universal joint drive from a differential comprising two universal joints and a single equalizer where the equalizer is offset from its adjacent joint and mounted in the differential housing.

Other objects of the invention will be apparent hereinafter from the specification and from the recital of the appended claims.

Figures 1, 2:
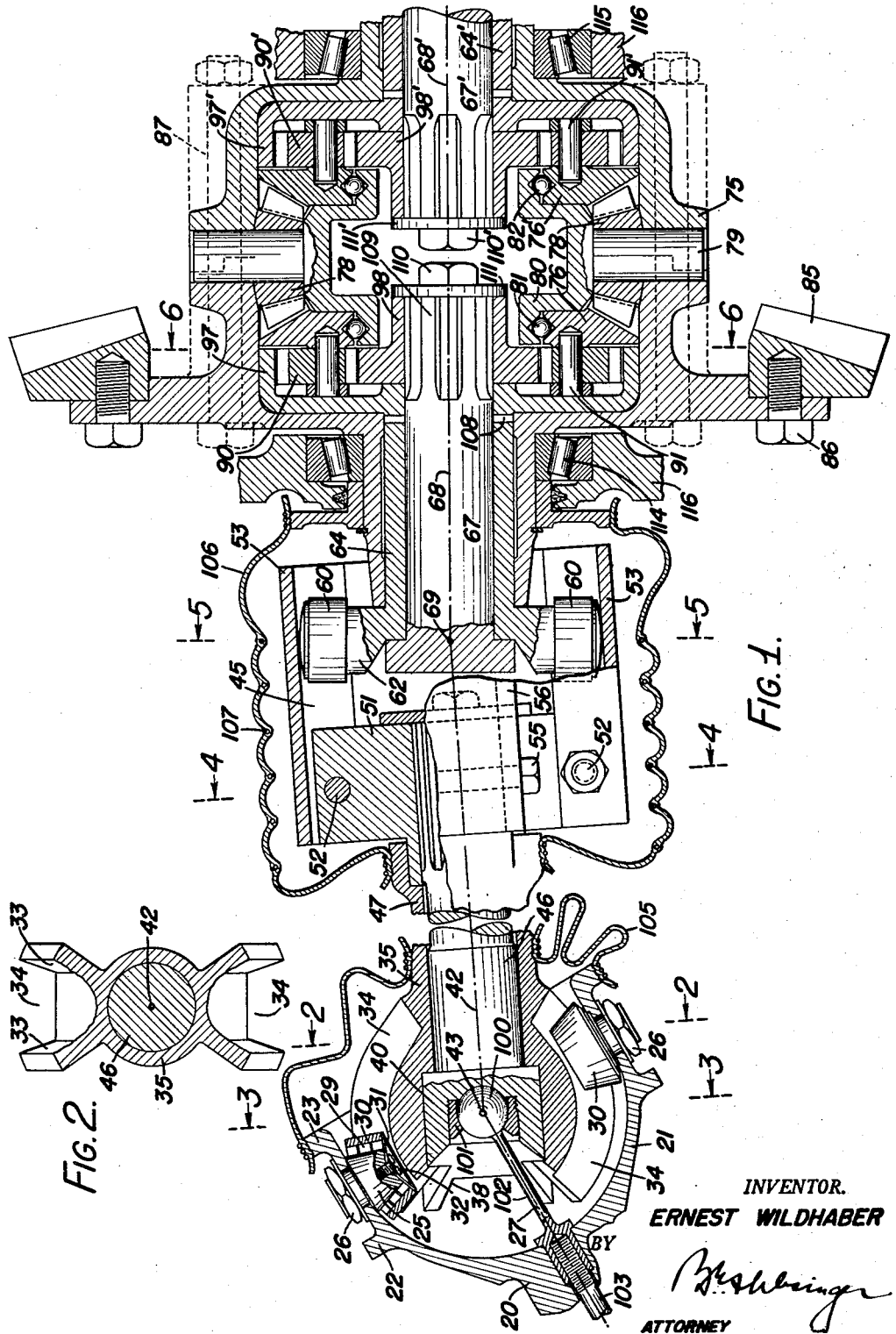
Fig. 1 is an axial section showing part of a front wheel drive for an automotive vehicle comprising two universal joints and a common equalizer disposed in the differential housing.
Fig. 2 is a cross-section taken approximately on the line 2—2 of Fig. 1 when the shafts are in axial alignment and showing the outer connecting member of one of the joints.
Figure 3:
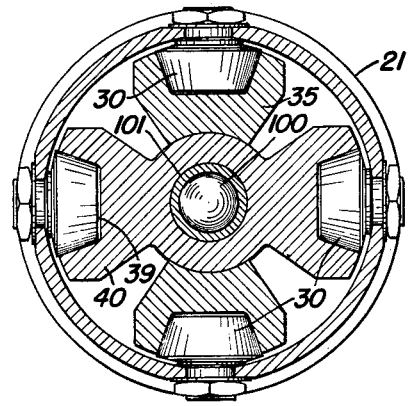
Fig. 3 is a section through the left hand joint, taken on the line 3—3 of Fig. 1 when the two axes of the joint are in axial alignment.
Figure 4:
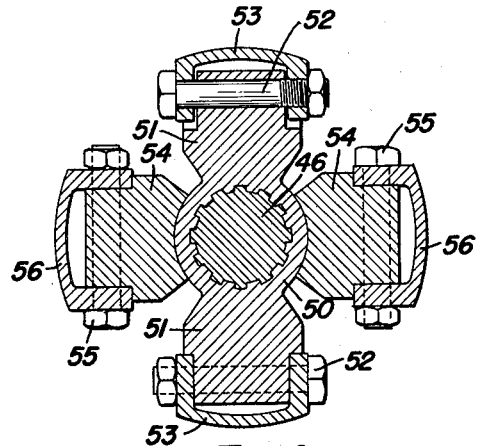
Figure 5:
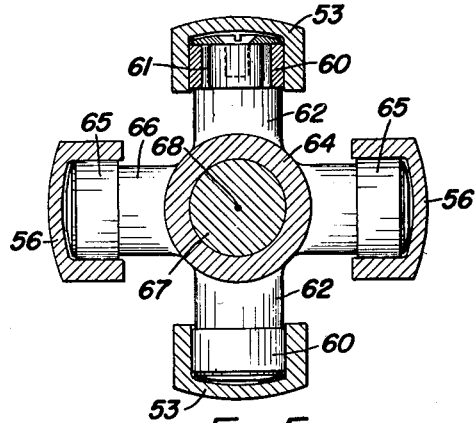
Figure 6:
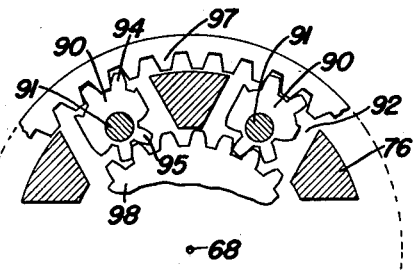
Figure 7:
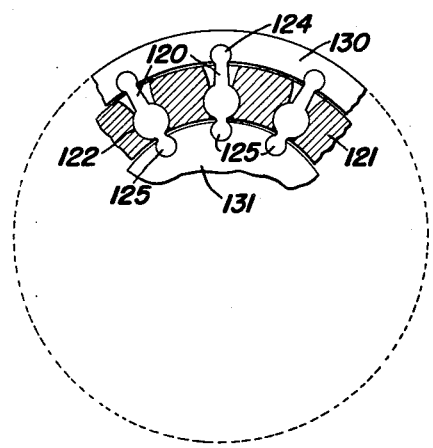
Figure 8:
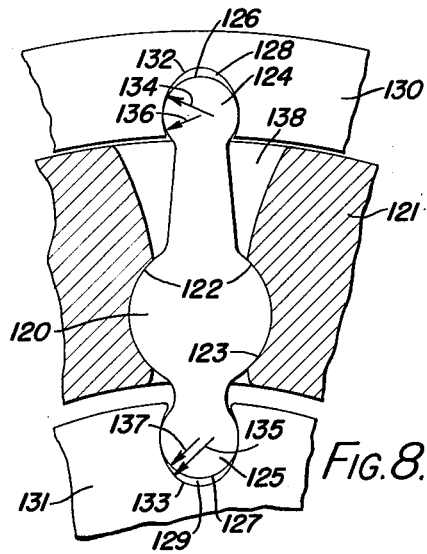
Figure 9:
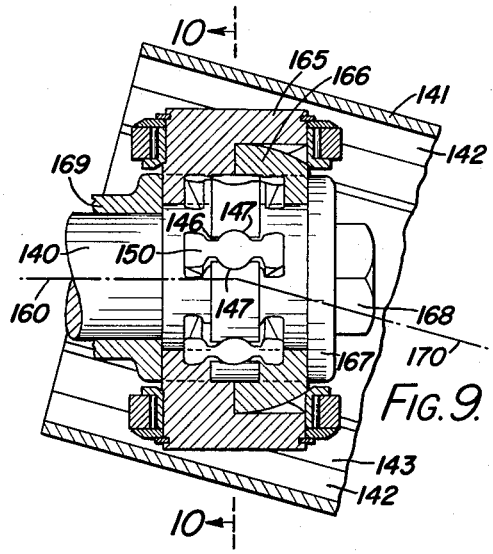
Figure 10:
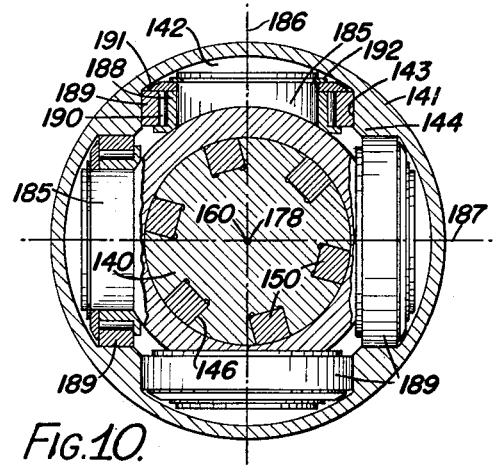
Figure 14:
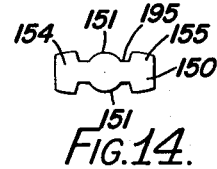
Figure 15:
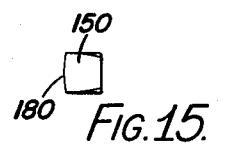
Figures 16, 18:
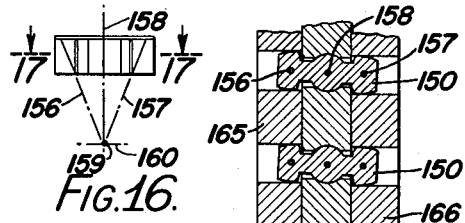
Figures 13, 17:
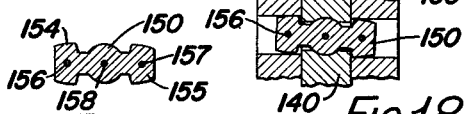
Figures 11, 12:
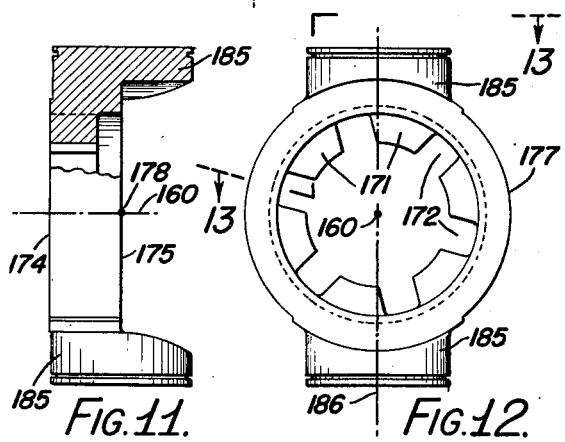

Figs. 4 and 5 are sections through the right hand joint taken along the lines 4—4 and 5—5, respectively, of Fig. 1 with the two axes of the joint in axial alignment;

Fig. 6 is a fragmentary sectional view taken along the line 6—6 of Fig. 1 and showing one form of an equalizer constructed according to the present invention;

Fig. 7 is a fragmentary sectional view similar to Fig. 6 and showing a modified form of equalizer constructed according to the present invention;

Fig. 8 is a fragmentary sectional view constituting a partial enlargement of Fig. 7 and showing one of the equalizing levers used, its mounting, and the parts with which it cooperates;

Fig. 9 is a fragmentary axial sectional view of a uniform motion universal joint in which an equalizer is employed constructed according to a still further modification of the invention;

Fig. 10 is a section taken along the line 10—10 of Fig. 9 with the two end members of the joint shown in axial alignment;

Fig. 11 is a part elevation, part section, showing one of the members used in the joint of Figs. 9 and 10;

Fig. 12 is an axial view of the part shown in Fig. 11;

Fig. 13 is a view taken along the line 13—13 of Fig. 12, looking in the direction of the arrows;

Figs. 14, 15 and 16 are an axial view, a side elevation and an end view, respectively, of one of the equalizing members of the joint shown in Figs. 9 and 10;

Fig. 17 is a section through this equalizing member taken on the line 17—17 of Fig. 16; and Fig. 18 is a diagrammatic developed view showing the action of the equalizing levers in this joint.

Reference will now be had first to the embodiment of the invention shown in Figs. 1 to 6 inclusive. Here 20 denotes the inside end of a front axle of an automotive vehicle to which drive is applied. The part 20 has a bell-shaped end 21 which is provided externally with reinforcing ribs 22 and 23. Mounted in holes between these ribs are a plurality of radially disposed pivot members 25. These are secured to the part 20 by nuts 26. There are two pairs of such pivot members provided in the drive shown; and the pivot members are equally spaced about the axis 27 of the front axle 20. The two pivots of each pair of pivot members are coaxial.

Mounted upon each pivot member by means of antifriction rollers 29 is a conical roller 30. The rollers are held on the pivots 25 by retainers 31 and screws 32.

One pair of coaxial tapered rollers 30 engages with opposite sides 33 (Fig. 2) of diametrically opposite grooves 34 formed in a connecting member 35. The other pair of rollers 30 engage opposite sides 38 (Fig. 1) of diametrically opposite grooves 39 formed in a second connecting member 40.

The two connecting members 35 and 40 are coaxial and are mounted for rotational movement relative to each other about their common axis 42. They form a connection with the universal joint 45 at the right. The connecting member 40 is formed integral with a shaft 46; and the connecting member 35 is formed integral with a sleeve 47 which surrounds shaft 46.

The ways 34 and 39 of the two connecting members are exactly alike. The ways 34 extend along arcs of the same circle in a plane containing the axis 42 of the joint. This is also true of the ways 39. The sides 33 and 38, respectively, of these ways are conical surfaces, the opposite sides of each groove being coaxial conical surfaces. They are surfaces such as may be swept out by a rotating milling cutter representing a roller 30 when the axis of that cutter is swung in a plane containing the axis 42 about the apex or center 43 of the joint.

Each pair of rollers 30 and the ways engaged by that pair of rollers act like a Cardan type joint connection and transmit precisely the same motion as a Cardan joint. Since the two pairs of rollers 30 are ninety degrees apart, each pair is in opposite phase as compared with the other. At any shaft angularity, therefore, the connecting members 35 and 40 turn at oppositely varying velocities when the axle turns at a uniform rate.

The shaft 46 is splined at its right hand end, as shown in Figs. 1 and 4; and rigidly secured on the splined portion of this shaft is a member 50 which has diametrically projecting arms 51 at opposite sides. Secured to the opposite ends of the arms 51 by means of bolts 52 are U-shaped straight guide rails 53. The sleeve 47 is similarly formed with diametrically disposed outwardly projecting arms 54 which extend over the hub portion of the member 50 in axial alignment with the arms 51 of that member. Secured to the ends of the arms 54 by bolts 55 are straight U-shaped guide rails 56 similar to the guide rails 53.

The guide rails 53 are engaged by a pair of diametrically disposed cylindrical rollers 60 (Figs. 1 and 5) that are rotatably mounted by means of antifriction needles or pins 61 on diametrically disposed arms 62 of a sleeve 64. The guide rails 56 are engaged by another pair of coaxial diametrically disposed cylindrical rollers 65 (Fig. 5) that are rotatably mounted on arms 66 that project diametrically from a shaft 67 which is mounted within the sleeve 64 coaxial therewith.

All four rollers 60 and 65 are alike; and their radial axes intersect each other and intersect the axis 68 of shaft 67 and sleeve 64 in the same point 69 (Fig. 1). The rollers 60 and 65 are part of the right hand universal joint of the drive. This right hand joint is subjected to smaller shaft angularities than the left hand joint. The latter may be called the high angle joint. The joint at the right may similarly be called the low angle joint.

The sleeve 64 and shaft 67 turn at opposite varying velocities when there is shaft angularity. These elements form part of an equalizer which is here disposed inside of a split differential housing 75.

The differential comprises two bevel side gears 76 and 76' and a plurality of planetary bevel pinions 78 which mesh with the side gears. The pinions 78 are rotatably mounted upon pins 79 which project radially outwardly from a spider 80 and which are secured in the differential housing 75. The spider and the side gears are journaled on one another by means of antifriction bearings 81 and 82. The drive is applied to the differential housing through a bevel or hypoid gear 85 which is secured by screws 86 to the differential housing. The two parts of the differential housing are secured together by bolts 87. Gear 75 is adapted to be driven from the engine of the automotive vehicle through the transmission and a meshing bevel or hypoid pinion (not shown).

Through the differential, drive is transmitted to both front wheels of the vehicle. What has been described so far are portions of the drive from the differential to one of the front wheels. The parts which transmit motion to the other front wheel from the differential are identical in construction to those heretofore described and a portion of the drive to the other front wheel is shown fragmentarily in Fig. 1. Like parts of the drives to the two front wheels are designated by the same reference numerals except that the parts of the drive to said other front wheel are primed.

The equalizer comprises a plurality of equalizing members 90 (Figs. 1 and 6) which are rotatably mounted upon pins 91. These pins are secured in the side gear 76 which forms a carrier for the equalizing members. The axes of the pivots 91 are parallel and parallel to axis 68. The equalizing members 90 fit into equispaced pockets 92 formed in the side gear about the axis 68.

Each equalizing member has two sets of spur gear teeth at opposite sides of its axis. These are denoted at 94 and 95, respectively. The teeth lie in the same plane of rotation, but the teeth 94 have a larger pitch radius and frequently a finer pitch than the teeth 95. The teeth 95 have a smaller pitch radius. In cross-section, each equalizing member is of generally oblong shape, the distance between the outside ends of the teeth 94 and 95 measured across the axis 91 being larger than the width of the member 90 measured at right angles thereto.

The teeth 94 mesh with an internal sun gear 97. The teeth 95 mesh with an external sun gear 98. The gears 97 and 98 are coaxial with axis 68. They are mounted for motion about said axis relative to each other and relative to the side gear 76. The tooth ratio between the teeth 94 and the internal gear 97 is, however, equal to the tooth ratio between the teeth 95 and the external gear 98. To obtain a maximum of rolling contact on the driving side, the teeth 94 and 95 are so arranged as to have contact at or near the pitch point in the mean position as shown in Fig. 6.

The motion of this equalizer is limited and the equalizing members 90 in operation turn substantially less than half a turn. Advantage is taken of this fact by arranging the teeth 94 and 95 directly opposite each other in the same plane. If the planet members 90 made more than half a turn then the two sets of teeth of each planet would have to be offset axially from each other.

The internal gear 97 is rigidly secured to the sleeve 64 by a face coupling 108 and the external gear 98 has a splined connection, by means of splines 109 with the shaft 67. A bolt 110 which threads into the shaft 67 and a washer 111 serve to secure the external gear 98 in axially fixed position abutting against the internal gear 97, and serve to hold the parts of the face coupling 108 in engaged position.

When drive is applied to the ring gear 85, the bevel pinions 78 transmit torque to the side gears 76. The torque then passes through the equalizing members 90 to the two elements 64 and 67. The action of the equalizer is here to permit oppositely varying motions of the two elements 64 and 67 and of the connecting members 35 and 40.

Each of the two joints forming part of the drive to a wheel centers itself through the contact of the four rollers in the grooves of the connecting members of the joint. To keep the ways 34 and 39 in axial alignment with the rollers 30, a ball 100 (Fig. 1) is provided. This ball is secured in a socket in shaft 46 by a nut 101. It is secured to a stem 102 that is fastened by means of a bolt 103 to the end member 20. The stem 102 is made thin enough to permit some lateral deflection. The ball 100 is then unable to oppose and "fight" the centering action constrained by the rollers 30.

Seals 105 and 106 are used to keep dust and dirt out of the joints and grease or oil in. They are made of synthetic rubber and are fastened with wires in known manner. Seal 106 may contain circular reinforcing rings or wires 107. These rings or wires hold the body of the seal against inward and outward displacements while permitting endwise displacement and bending of the seal body. Thus, the deflection of the seal is not localized but may be more evenly distributed. This will result in longer life for the seal.

The two parts of the differential housing are journaled on antifriction bearings 114 and 115 in the frame 116 of the vehicle.

A modified form of equalizing member that may be employed in an axle drive such as described is shown in Figs. 7 and 8. This embodiment is especially suitable for smaller motions of the equalizer as occur, for instance, with independently sprung rear wheels. Here the equalizing members are in the form of levers 120. The levers 120 are pivotally mounted in a carrier 121 which again may be part of one of the side gears of the differential. For the purpose of this pivotal mounting each lever 120 is formed with a cylindrical bearing surface 122 which seats in cylindrical recesses or sockets 123 formed in the carrier 121. The carrier 121 is recessed at opposite sides of the lever as denoted at 138 to permit free swinging movement of the levers in operation.

Each lever 120 has working portions 124 and 125 formed at opposite ends. These working portions also have cylindrical surfaces 126 and 127, respectively. The working portions engage in recesses 128 and 129, respectively, provided in internal and external elements 130 and 131, respectively. These elements correspond to the internal and external gears 97 and 98 of the first-described embodiment of the invention. The recesses 128 and 129 contain concavely curved profiles 132 and 133, respectively. The radii 134 and 135, respectively, of these profiles are preferably made larger than the radii 136 and 137 of the cylindrical working portions of the lever. If desired, however, plane sides and especially parallel plane sides may be provided in the recesses 128 and 129 in place of the concave sides 132 and 133.

A further embodiment of the invention will now be described with reference to Figs. 9 to 18 inclusive. In the equalizer illustrated in this embodiment of the invention, equalizing levers are also used, but they are journaled on pivot axes which are radial of the axis of one of the members of the joint.

The shaft 140 denotes one member of the universal joint; and the sleeve 141 is the other member. The sleeve 141 is provided with four axially extending grooves or slots 142 whose opposite sides 143 (Fig. 10) are plane surfaces and bound teeth 144. The end member 140 is provided with slots or grooves 146. The sides of these slots are formed between their ends with cylindrical recesses 147 (Fig. 9). Mounted in each of these slots and journaled in the recesses 147 are equalizing levers 150, each equalizing lever having a cylindrical surface 151 (Fig. 14) which is journaled in the opposed recesses 147 of a slot 146.

Each equalizing member 150 has working portions 154 and 155 (Fig. 17) at opposite ends and each of these working portions is a part of a cylindrical surface whose axis is inclined at other than right angles to the pivotal axis 158 of the equalizing member. The axes 156 and 157 of the cylindrical working portions lie in a plane of symmetry. They intersect each other and the pivot axis 158 in the same point 159. This point lies on the axis 160 of the end member 140. The three axes 156, 157 and 158 are in the same plane; and this plane in the middle, neutral position of the levers 150 also contains the axis 160 of the end member 140.

The working portions of the levers 150 extend only through small arcs. Only the profile portion actually used needs to be circular. Adjacent the circular portion a straight portion tangent to the circular portion may be provided.

Mounted upon the end member 140 for turning motion relative to said end member and relative to each other about the axis 160 of the end member are two ring-shaped members 165 and 166. They are held against axial movement relative to the shaft 140 and relative to each other by an end disc 167 which is secured to the shaft by a bolt 168, and by a spacer 169 which may be secured against a shoulder formed on the shaft, or which may be threaded on the shaft.

The two ring-shaped members 165 and 166 are alike in structure. One of them is shown separately in Figs. 11 to 13 inclusive. Each has internal spline-like projections 171 formed by axially straight slots or gashes 172. The slots have parallel plane sides that extend axially. The width of the slots is equal to the diameter of the cylindrical working surfaces of the equalizing levers 150 plus a tolerance for running fit.

The ring-shaped members 165 and 166 have plane faces 174 and 175 at opposite sides. These members are formed with outside surfaces 177 which are spherical surfaces centered at 178. The ring members are mounted to have their inside faces 175 in contact with one another. The equalizing levers 150 extend at both ends beyond the ends of the slots 146 in the shaft 140 and reach into the slots 172 of the ring members; and their working portions 154 and 155 engage the parallel plane sides of said slots 172. One end of each lever 150 engages in a slot 172 of one ring member 165; and the other end of each lever 150 engages in a slot 172 in the other ring member 166. They let the two ring members 165 and 166 move equally in opposite directions relative to the end member 140. This is done without any jamming in any working position and without any backlash or change of backlash.

Fig. 18 further explains the action. This figure is a development to a plane of a cylindrical middle section of the end member and the ring members. The levers 150 are shown in tilted positions. Ring member 165 is shown displaced upwardly and ring member 166 is shown displaced downwardly as compared with end member 140. The upward and downward displacements of the ring members 165 and 166 are equal. In other words, the equalizer guarantees that the motions of the two ring members and of the lever carrier are so related to each other that the motion of the carrier is the exact average of the motions of the ring members.

On their outer ends the levers 150 have a cylindrical surface 180 which is preferably eased off slightly at both ends. The levers may be mounted with a slight amount of axial play.

Each ring member contains a pair of diametrically opposite pivots 185 which are coaxial with each other. The axes 186 and 187 of the pivots of the two ring members are radial of and perpendicular to the axis 160 of the ring members, and intersect axis 160 in the point 178. In the mean position of the ring members the pivot axes 186 and 187 are perpendicular to each other.

Each pivot 185 projects radially outwardly and laterally from the body portion of its ring member. A circular flange or race 188 is secured about each pivot 185 with a press fit. This forms the inner race of a needle bearing. A cylindrical roller 189 forms the outer race of each bearing, and is supported by the needles 190. An end washer 191 secured by a snap ring 192, keeps the needles 190 and the roller 189 in place axially.

The four rollers 189 mounted on the two pair of pivots engage the four equi-angularly spaced guide slots 142 provided in the end member 141. Preferably, either the cylindrical roller surfaces are eased off slightly at their ends so that the axial profile of each roller is not exactly straight but slightly convex, or the straight profile of each axial guide slot 143 is eased off so that it is slightly convex. This is to keep heavy loads away from the profile ends even when there is deflection or inaccuracy.

The general action of this joint is the same as already described. Uniform rotation of the internal member 141 causes the ring members 165 and 166 to rotate at a somewhat varying velocity when there is angularity between the axes 160 and 170 of the two end members 140 and 141. The variation in velocity repeats with every half turn of the end member 141. Since the guide slots engaged by the two pairs of rollers 189 are ninety degrees apart, the velocities of the ring members 165 and 166 vary oppositely. When one is advanced, the other lags back. Their average motion is very nearly uniform. Through the equalizer the end member 140 has the average motion. The equalizer also constrains the two pairs of rollers 189 to carry the same load. With this arrangement, therefore, the load is shared by two pivot axes 186 and 187 and by two roller pairs 189. There are two Cardan type joint connections used in parallel; and, moreover, the two together with the equalizer make up a uniform motion universal joint.

The equalizer shown in Figs. 9 to 18 inclusive can be mass-produced at low cost. The splined inside portions of the ring members 165 and 166 can be broached. Likewise the splines of the end member 140 can be broached. The cylindrical recesses 147 can be drilled and reamed simultaneously. The equalizing levers 150 may be made from sheet metal or plate which is rolled or milled to the desired profile shape to obtain corrugations that are parallel. Then strips may be cut or sawed perpendicular to the corrugations. Each strip will then contain a plurality of levers joined end to end. The inclined cylindrical surfaces of the levers may be formed on a strip by pressure in a cold state, by coining, or preferably by cold rolling. There is only small displacement of the material so that a pressure method is satisfactory. Finally the completed strip may be cut up into individual levers by a plurality of coaxial disc saws.

If desired, the narrow portions 195 of the levers 150 may be made thin enough for noticeable resilience. They then act somewhat like springs so that the loads on all the levers are substantially equal even when the manufacturing tolerances are large.

While the invention has been described in connection with certain specific embodiments thereof, it will be understood that it is capable of further modification, and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. An equalizer comprising a rotatable carrier having a plurality of slots equi-spaced about its axis, each of said slots extending in the direction of said axis and having aligned and coaxial arcuate cylindrical recesses in its opposite side walls, an equalizing lever mounted in each slot and having a cylindrical bearing surface intermediate its ends mounted in the recesses of the side walls of the slot to pivotally support the lever in the slot, each bearing surface being coaxial with the recesses in which it is mounted, the axes of said cylindrical recesses and of said cylindrical bearing surfaces being radial of the first-named axis, each equalizing lever having two working portions diametrically disposed at opposite sides of its pivotal axis, which are parts of cylindrical surfaces, the axes of the two cylindrical working surfaces of each lever lying in the same plane and intersecting the pivotal axis of the lever, and two elements coaxial with said carrier and operatively connected, respectively, to the two working portions of each lever.

2. An equalizer comprising a rotatable carrier having a plurality of slots equi-spaced about its axis, an equalizing lever pivotally mounted in each slot with working portions at opposite ends, the working portions at the two ends being parts of cylindrical surfaces whose axes intersect in the pivotal axis of the lever, and two elements mounted coaxial with said carrier for relative rotational movement thereon, said elements having spaces with parallel plane sides engaged, respectively, by the working portions at opposite ends of the levers.

3. An equalizer comprising a rotatable carrier having a plurality of slots equi-spaced about its axis, each slot having aligned arcuate cylindrical recesses in its opposite side walls, an equalizing lever journaled in the recesses of each slot for pivotal movement about an axis radial of the carrier axis, each lever having partial cylindrical working surfaces at opposite ends whose axes intersect the pivotal axis of the lever in the same point, and two ring-shaped elements coaxial with said carrier and mounted for relative rotational movement thereon, said elements having internal spaces with parallel plane sides engaged, respectively, by the working portions at opposite ends of said levers.

4. A universal joint for connecting two end members having angularly disposed axes, comprising two oscillatory members mounted coaxially on one of said end members for oscillation relative to said one end member and to each other, each of said two oscillatory members having a pair of diametrically opposite coaxial pivot portions extending radially of its axis, the pivot portions of the two members being disposed so that their pivot axes intersect, a part mounted on each of said pivot portions for pivotal motion thereon, guide portions connected with the other end member, said guide portions being engaged by said parts, and an equalizer coaxial with said one end member for transmitting the average motion of said two oscillatory members to and from said one end member, said equalizer comprising a plurality of levers which have separated outside bearing surfaces intermediate their ends, the outside bearing surfaces of said levers being mounted in arcuate recesses formed in slots in said one end member and the opposite ends of said levers having working portions engaging said two oscillatory members, the working portions at opposite ends of each lever being parts of cylindrical surfaces whose axes intersect the pivot axis of the lever on the axis of said one end member.

5. A universal joint for connecting two end members that have angularly disposed axes, said joint comprising two oscillatory members mounted coaxially with one of said end members in axially fixed positions for oscillation relative to said one end member and to each other, each of said two oscillatory members comprising a pair of diametrically opposite coaxial pivot portions which extend radially of its axis, the pivot portions of the two oscillatory members being disposed so that their pivot axes intersect, a part mounted on each of said pivot portions for pivotal motion thereon, guide portions connected to the other end member, said guide portions containing parallel straight guide ways engaged by said parts, and an equalizer coaxial with said one end member for transmitting the average motion of said two oscillatory members to and from said one end member, said equalizer having portions disposed on both sides of the plane containing said pivot axes and being operatively connected to said two oscillatory members, and said equalizer having a portion operatively connected to said one end member, and means on said one end member for holding said two oscillatory members against axial movement.

References Cited in the file of this patent

UNITED STATES PATENTS

| Number | Name | Date |
|---|---|---|
| 856,943 | Church et al. | June 11, 1907 |
| 1,495,703 | MacFarland | May 27, 1924 |
| 1,498,678 | Chavrier | June 24, 1924 |
| 1,591,794 | Stevens | July 6, 1926 |
| 2,102,973 | Porsche | Dec. 21, 1937 |
| 2,418,555 | Kirsten | Apr. 8, 1947 |
| 2,424,564 | Halbrook | July 29, 1947 |
| 2,432,803 | Rice | Dec. 16, 1947 |
| 2,516,077 | Schmitter | July 18, 1950 |

FOREIGN PATENTS

| Number | Country | Date |
|---|---|---|
| 250,987 | Switzerland | 1948 |